| United States Patent [19] | [11] 3,920,602 |
| Freed | [45] Nov. 18, 1975 |

[54] THERMOPLASTIC NYLON MOLDING RESINS

[75] Inventor: William T. Freed, Madison, N.J.

[73] Assignee: Celanese Corporation, New York, N.Y.

[22] Filed: Aug. 12, 1974

[21] Appl. No.: 496,608

[52] U.S. Cl. .............................. 260/37 N; 260/857 R
[51] Int. Cl.² ..................... C08L 63/02; C08L 77/10
[58] Field of Search ............ 260/857 R, 830 P, 860, 260/37 N, 37 EP

[56] References Cited
UNITED STATES PATENTS

| 3,329,740 | 7/1967 | Battersby | 260/860 |
| 3,419,517 | 12/1968 | Hedrick et al. | 260/37 N |
| 3,714,289 | 1/1973 | Schober et al. | 260/830 P |

Primary Examiner—Donald E. Czaja
Assistant Examiner—S. M. Person
Attorney, Agent, or Firm—Thomas J. Morgan; Linn I. Grim; Marvin Bressler

[57] ABSTRACT

An improved thermoplastic molding resin comprising intimately mixed nylon molding resin and reinforcing agents in the presence of a thermoplastic phenoxy resin.

7 Claims, No Drawings

THERMOPLASTIC NYLON MOLDING RESINS

The present invention relates to the products and process for preparing improved thermoplastic molding resins. More specifically, this invention describes improved reinforced nylon polymers.

Reinforced nylon polymers provide increased strength properties in molded articles. There is continual search to provide improvements over the known reinforced nylon molding resins.

It has now been discovered that improved thermoplastic reinforced nylon polymers are provided by the incorporation of small amounts of specific high molecular weight phenoxy resins in these compositions. The compositions of this invention not only provide improved physical properties but provide in some instances improved surface effects of the molded articles.

The linear polyamide as utilized herein is meant to include synthetic linear polyamides which can be prepared from polyamide forming monomers such as monoaminocarboxylic acids, their amide-forming derivatives, or from suitable diamines and suitable dicarboxylic acids or amide-forming derivatives of these compounds. The polyamides produced having recurring amide groups as an integral part of the main polymer chain and the recurring intra-linear carbonamide groups in these polyamides are separated by hydrocarbon groups containing at least two carbon atoms. Synthetic linear polyamides which can be prepared according to the method of this invention are all those of the nylon type having a relative viscosity between 35 and 100, and preferably between 45 and 65, as measured in a solution of 2 grams of the polyamide in 21.8 grams of a 90 percent formic acid solution.

Preparation of such polymers is typically illustrated in U.S. Pat. Nos. 2,071,200; 2,071,253; 2,130,948; 2,285,009; 2,361,717; 2,512,606; 3,193,535; and 3,431,236 among others.

Particular polyamides which can be prepared according to the method of this invention include, among others, polyhexamethylene adipamide, polyhexamethylene sebacamide, polymerized 6-aminocaproic acid, polytetramethylene adipamide, polytetramethylene sebacamide, and polyadipamides prepared from di (4-aminocyclohexyl) ethane or 1,6-di (4-aminocyclohexyl) hexane as the diamine component.

The preferred polyamides used in this invention include: nylon 6, nylon 66, nylon 610, nylon 11 and nylon 12. These are commercially available polymers and their methods of preparation are described in the Encyclopedia of Chemical Technology, vol. 10, pages 924-928, Interscience Publishers Inc., N.Y.C. (1953). Other polyamides which fall within the ambit of this invention include both those made from amino acids or the corresponding alicyclic lactams as well as those made from salts of diamines and dibasic acids.

The phenoxy resins utilized herein are high molecular weight thermoplastic resins which are produced from 2,2-bis (4-hydroxyphenyl) propane and epichlorohydrin according to the procedure as described in U.S. Patent 3,356,646 issued Dec. 5, 1967. The basic chemical structure of the phenoxy resins is similar to that of epoxy resins. They are, however, a separate and unique resin class, differing from epoxies in several important characteristics:

1. Phenoxy resins are tough and ductile thermoplastics. Their average molecular weight ranges from 15,000 to 75,000 preferably from 20,000 to 50,000 compared with 340 to 13,000 for conventional epoxies which crosslink on polymerization.

2. Phenoxy resins do not have terminal highly reactive epoxy groups and are thermally stable materials with a long shelf life.

3. The phenoxy resins can be used without further chemical conversion. They require no catalysts, curing agents or hardeners to be useful products while epoxy resins require catalysts, curing agents or hardeners to be useful. The phenoxy resins utilized herein can be characterized by a repeating structure:

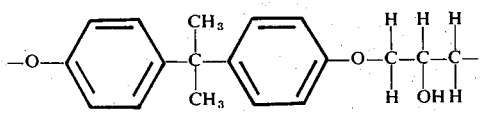

and having an average molecular weight range from about 15,000 to 75,000. As is obvious, the terminal structure is completed with hydrogen atoms or suitable end capping groups.

The thermoplastic phenoxy resin can be added to the reinforced polyester resin in a number of ways (1) by incorporating the phenoxy resin onto the reinforcing agent prior to its intimate blending with the nylon resins, (2) by simultaneously intimately mixing with the reinforcing agent and the nylon resins and (3) by blending with the polymer and then intimately blending with the reinforcing agents. Other mixing techniques can be used.

The amount of phenoxy resin incorporated can range from about 0.1 to about 8 weight percent preferably from about 0.5 to about 3 weight percent of the total thermoplastic polyester molding resin.

The reinforcing agents as utilized herein which provide increased strength to the molded product can be intimately mixed by either dry blending or melt blending, blended in extruders, heated rolls or other types of mixers. If desired, the reinforcing agents can be blended with the monomers in the polymerization reaction as long as the polymerization reaction is not affected. The type of fillers which can be used include among others, glass fibers (chopped or continuous rovings), asbestos fibers, cellulosic fibers, synthetic fibers, including graphite fibers, acicular calcium metasilicate and the like. The amount of reinforcing agent can range from about 2 to about 60 weight percent, preferably 5 to 60 weight percent based on the total molding composition.

The following examples will serve to illustrate the invention without limiting the same.

EXAMPLES

Polyhexamethylene adipamide (nylon 66) molding resin having a relative viscosity of 50 was tumble blended with glass fibers (⅛ inch length) and then extrusion blended by force feeding through a 2½ inch single screw extruder with a strand die. The temperature of the extruder and die were set at 545, 535 and 520 and 520°F. (from barrel to die). The strands were chopped in a rotary chopper to ⅛ inch lengths. In the use of additives, phenoxy resin, free of epoxide groups, prepared from 2,2-bis(4-hydroxyphenyl) propane and epichlorohydrin having a number average molecular weight in the range from 27,000 to 29,000 can be added in the tumble blender or in the extrusion blender. The diepoxide of the reaction product of 2,2-bis(4-hydroxyphenyl) propane and epichlorohydrin having a number average molecular weight in the range from 8,000 to 12,000 can also be added in the identical places as the phenoxy resin. Reference to the diepoxide is hereinafter described as epoxy.

The various materials prepared were molded into tensile test bars under the following conditions:

| Processing Temperature | 525°F. |
| Mold Temperature | 200°F. |
| Screw Speed | 80 rpm. |
| Total Cycle Time | 35 seconds |

The results in Table I utilize 30 weight percent glass fibers (⅛ inch length) intimately mixed with nylon 66 molding resin in the presence of various amounts of additives such as phenoxy resin and epoxy.

TABLE I

| | (DRY-AS-MOLDED PHYSICAL PROPERTIES) | | | | | |
| --- | --- | --- | --- | --- | --- | --- |
| | Control | 0.5% Phenoxy | 1% Phenoxy | 1.5% Phenoxy | 2% Phenoxy | 2% Epoxy |
| Tensile Strength, psi | 23,200 | 22,400 | 23,500 | 24,650 | 24,400 | 23,750 |
| Energy to Break, in.-lbs. | 128 | 113 | 136 | 150 | 143 | 119 |
| Percent Elongation | 2.5 | 2.4 | 2.9 | 3.25 | 3.2 | 2.7 |
| Flexural Strength, psi. | 35,300 | 33,400 | 35,450 | 36,300 | 35,650 | 32,800 |
| Flexural Modulus, psi × 10⁻⁶ | 1.21 | 1.17 | 1.17 | 1.17 | 1.18 | 1.19 |
| Notched Izod Impact, ft-lb/in | 1.17 | 1.23 | 1.22 | 1.30 | 1.33 | 1.40 |
| Reverse Notched Izod ft/lb/in | 10.8 | 10.5 | 10.6 | 11.0 | 13.1 | 11.0 |
| ½ lb. Gardner Impact, in.-lb. | 7.13 | 6.5 | 6.5 | 6.5 | 6.33 | 3.5 |

The comparative results indicate that at levels above 0.5 percent phenoxy resin improvements in physical properties such as tensile strength and notched izod impact are demonstrated over the control - non-additive sample. Furthermore, at the 2 percent phenoxy resin level improvements over the 2 percent epoxy resin level are shown in tensile strength, energy to break, percent elongation, flexural strength, reversed notched izod and ½ lb. Gardner impact but the epoxy additive demonstrated improvements in notched izod impact only. Thus, phenoxy resins added to nylon molding resins do provide overall improvements. In these results the exception is in the 0.5 percent phenoxy additive where only notched izod impact is improved over the control - no additive. This can be explained in that at 0.5 percent phenoxy level only partial glass reinforcement level is covered by the phenoxy and glass is broken up and improvements except in notched izod impact are not obtained. If the phenoxy resin at 0.5 percent level is incorporated on the glass fiber before intimately mixing with the nylon then improved results similar to the 1½ percent phenoxy level are obtained.

What is claimed is:

1. An improved thermoplastic molding resin comprising a synthetic linear polyamide polymer having a relative viscosity in the range of from 35 to 100; from about 5 to about 60 weight percent, based on the total thermoplastic molding resin, of a reinforcing agent intimately mixed with said polymer; and from above 0.5 to about 3 weight percent, based on the total thermoplastic molding resin, of a thermoplastic phenoxy resin having the repeating structure:

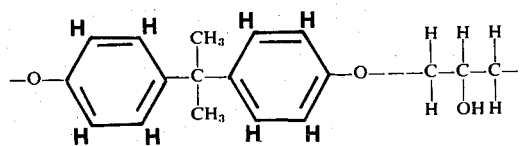

2. The product of claim 1 wherein the reinforcing agents are glass fibers.

3. The product of claim 1 wherein the reinforcing agent is acicular calcium metasilicate.

4. The product of claim 2 wherein the polyamide polymer is polyhexamethylene adipamide and having a relative viscosity in the range from about 45 to about 65.

5. The product of claim 3 wherein the polyamide polymer is polyhexamethylene adipamide and having a relative viscosity in the range from about 45 to about 65.

6. The product of claim 4 wherein the phenoxy resin has an average molecular weight ranging from about 20,000 to about 50,000.

7. A process for producing an improved thermoplastic molding resin wherein a synthetic linear polyamide polymer having a relative viscosity in the range from 35 to 100 is intimately mixed with about 5 to 60 weight percent of the total molding resin of a reinforcing agent in the presence of above 0.5 to about 3 weight percent of the total molding resin of a thermoplastic phenoxy resin having a repeating structure:

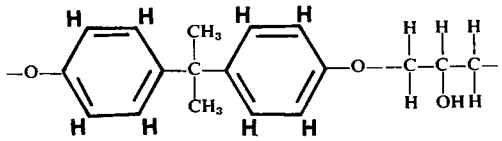

and an average molecular weight range from about 15,000 to about 75,000.

* * * * *